United States Patent [19]

Okamoto

[11] Patent Number: 4,769,717
[45] Date of Patent: Sep. 6, 1988

[54] APPARATUS FOR PRODUCING IMAGES

[75] Inventor: Masashi Okamoto, Akashi, Japan

[73] Assignees: Leo Giken Co., Ltd., Tokyo; Sakata Shokai, Ltd., Osaka, both of Japan

[21] Appl. No.: 940,961

[22] Filed: Dec. 12, 1986

[30] Foreign Application Priority Data

Dec. 16, 1985 [JP] Japan .................. 60-283970

[51] Int. Cl.$^4$ .................................... H04N 1/40
[52] U.S. Cl. .................. 358/280; 358/285; 358/287; 358/299
[58] Field of Search ............... 358/280, 285, 287, 206, 358/299

[56] References Cited

U.S. PATENT DOCUMENTS

| 4,205,350 | 5/1980 | Gunning | 358/285 |
| 4,233,636 | 11/1980 | Harbaugh et al. | 358/287 |
| 4,561,024 | 12/1985 | Tamura | 358/287 |
| 4,651,225 | 3/1987 | Yamada | 358/287 |
| 4,679,096 | 7/1987 | Nagashima | 358/287 |
| 4,710,821 | 12/1987 | Ohta | 358/287 |

FOREIGN PATENT DOCUMENTS 2549669 1/1985 France .

OTHER PUBLICATIONS

Patent Abstract of Japan "Deflecting Device of Laser Scan", No. 56-146359 (A); date: 11-1981; Inv. Yukio Sakai; Assignee: Matsushita Denki Sangyo K.K.

Primary Examiner—Edward L. Coles, Sr.
Attorney, Agent, or Firm—Marshall, O'Toole, Gerstein, Murray & Bicknell

[57] ABSTRACT

This disclosure relates to an image reproduction apparatus for reproducing images through laser beam scanning using galvano mirrors. The apparatus includes a memory device which stores an image signal in an image signal memory in accordance with a grid clock signal; a reading/processing/writing device which reads the image signal from the image signal memory, performs image processing, and writes the processed image signal into a processed image signal memory in accordance with the clock signal from another clock generator; and a reading device which reads the processed image signal from the processed image signal memory in accordance with the grid clock signal. The image signal picked up through the scanning of the laser beam is deflected by the galvano mirrors and is first amplified and processed as needed, and then it is converted to the digital signal by an A/D converter, and the digital signal is stored in the image signal memory device in accordance with the grid clock signal. Next, in accordance with the clock signal from a different, more stable clock generator, such as a crystal oscillator, the image signal read from the image signal enhancement memory undergoes tone correction, image enhancement, making halftone, enlargement, reduction, or any other necessary image processing, and then the processed signal is stored in a processed image signal memory device. Next, the image reproduction device reads the processed image signal from the processed image signal memory and outputs it.

2 Claims, 4 Drawing Sheets

APPARATUS FOR PRODUCING IMAGES

FIELD AND BACKGROUND OF THE INVENTION

This invention relates generally to apparatus for reproducing originals or images, and more particularly to such apparatus utilizing a laser beam and exhibiting superior performance in the processing of the image signal.

Systems for image reproduction have recently been developed which scan an original (transparent or reflection originals of photographs, line drawings, characters, pictures, etc.) and reproduce another image, using a laser beam. Because they are capable of highspeed, high resolution, and noiseless recording and processing, such apparatus have been used as scanners, laser printers, and other equipment in the fields of printing and copying. However, there are some difficulties in the constitution of the laser optics as described below.

In the case where an apparatus of this type has rotating polygonal mirrors used as deflectors of the laser beam, in order to accurately deflect the laser beam and scan the originals, it is necessary to use polygonal mirrors having such high precision that the accuracy of the pyramidal error is within a few seconds. To obtain polygonal mirrors having such high accuracy, high-level manufacturing technology is required. In addition, because the rotation of the mirrors is performed at high speed, high-level bearing technology is also needed.

In addition, when the beam is deflected by the rotating polygonal mirrors onto the original, or recording material, if a conventional lens is used, the scanning speed on the original will be different toward the periphery from the center area, and this non-uniform scanning speed will cause distortions to appear in the image. Thus an f$\theta$ lens is used in order to correct these distortions. The f$\theta$ lens is a special large-diameter lens, and high-level technology is required for both the design and the manufacture of the lens, thus making the lens quite expensive.

In place of this special optical system as described above, mirrors, such as galvano mirrors which deflect through an angle in accordance with an electrical signal, can be used to deflect the laser beam.

Figure 4:
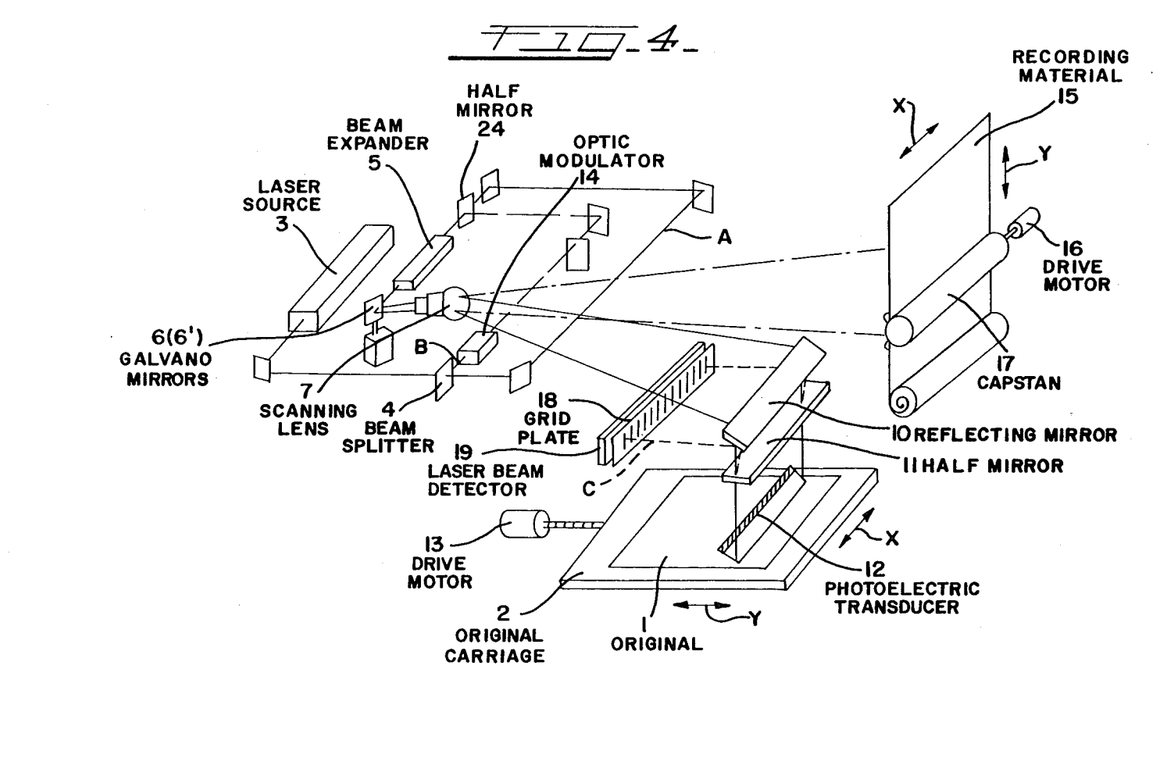
FIG. 4 is a perspective view of a representative example of an image reproduction device using a laser beam and galvano mirrors.

FIG. 4 shows a representative example of an apparatus for image reproduction which uses a laser beam and galvano mirrors. A description of the basic construction of this apparatus is as follows. The original 1 to be reproduced is placed on the original carriage 2. The beam from a laser light source 3 is passed through a beam splitter 4. One part A of the split beam is guided on the beam path indicated by the solid lines, passed through a beam expander 5 as needed, deflected in the x direction by the galvano mirror 6, focused by the scanning lens 7, reflected by the reflecting mirror 10, and passed through the half mirror 11 in order to scan the original image 1. An amount of light corresponding to the density of the original image 1 is converted into an electric signal by a photoelectric transducer 12 including an array of photodiodes, etc., and thus becomes the image signal. This image signal undergoes amplification, analog to digital (A/D) conversion, and other processing, and then further image processing such as tone correction, image enhancement etc., is performed as needed in order to obtain a processed image signal which corresponds to the image.

Scanning of the original in the y direction is performed by driving the carriage 2 using the drive motor 13.

Meanwhile, in order to record the image, the other part B of the laser beam split by the beam splitter 4 is used. This beam B is guided as indicated by the broken line beam path shown in FIG. 4. After the beam is modulated by an optic modulator 14, via a galvano mirror 6′, the surface of the recording material 15 is scanned and exposed in the x direction. The recording material 15 is moved in the y direction by a drive motor 16 via a capstan 17.

Swinging the galvano mirrors 6 and 6′ at high speed in accordance with a sawtooth wave and the like would be extremely difficult. The preferred way to drive the galvano mirrors is to deflect the reflecting mirrors by resonance in a sine wave, thus making it possible to achieve a stable drive at high speed. However, with this deflection method, because the scanning speed differs between the center (in the x direction of scanning) and the periphery, the original or the reproduced image will be read or reproduced in a distorted form.

In other words, whether rotating polygonal mirrors or galvano mirrors are used as the deflection mirrors, and also no matter what design is used for the scanning lens, it is extremely difficult to completely eliminate this kind of distortion. Furtheremore, because the deflection means used in these devices requires mechanical rotation, it is impossible to obtain completely identical scanning conditions in all rotations, which means that the distorted condition just described will change slightly from one scanning to the next.

For these reasons, in addition to the laser beam used for image recording (or image reading), a laser beam is also used as a synchronizing signal, thus providing a way to correct the distortion in recording or reading due to the changes of the scanning speed. In the apparatus shown in FIG. 4, the laser beam C which is reflected by the half mirror 11 from beam A and which passes through the reflecting mirror 10 is selectively passed by a grid plate 18 containing equally spaced light shield slits, and detected by the laser beam detector 19 which forms a pulse signal S (refer to FIG. 6) having a frequency proportional to the deflection speed of the laser beam.

Figure 5:
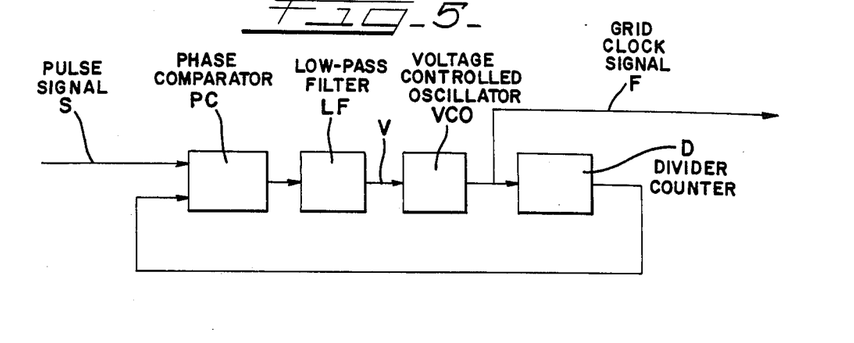
FIG. 5 is a block diagram of the circuit for forming the grid clock signal.

This pulse signal S is multiplied before use. In other words, as shown in FIG. 5, the pulse signal S from the laser beam detector 19 is fed to one input terminal of a phase comparator PC whose output is converted into a voltage V (refer to FIG. 6) by a low-pass filter LF. This voltage is supplied as the frequency control voltage for a voltage-controlled oscillator VCO (FIG. 5), and the resulting output is fed to a divider counter D, the output of which is fed to another input terminal of the phase comparator PC. The multiplication ratio of this PLL frequency multiplier circuit is equivalent to the division ratio of the divider counter D.

Figure 6:
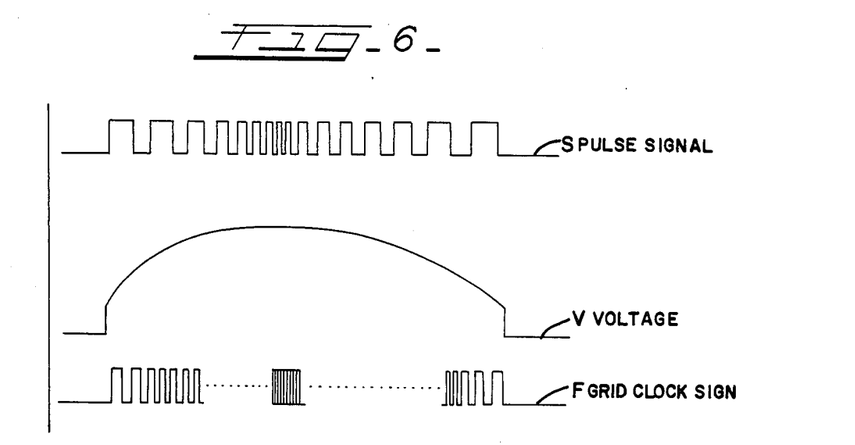
FIG. 6 shows the waveforms of the various signals of the circuit shown in FIG. 5.

FIG. 6 shows the various signals discussed above of the speed distortion correction circuit shown in FIG. 5. Although the galvano mirrors (6 and 6′) are driven in approximately the shape of a sawtooth wave, the incompleteness, etc., of the drive at the peripheral areas causes the scanning speed to be non-uniform. Because the light shield slits are equally spaced in the grid plate 18, a pulse signal S having a frequency proportional to the scanning speed is obtained by the laser beam detector 19. Through the function of the PLL frequency multiplier circuit described above, a grid clock signal F which has a frequency multiplied from the pulse signal S only by that amount of the set multiplication ratio and which is proportional to the scanning speed, is obtained from the voltage-controlled oscillator VCO.

Figure 7:
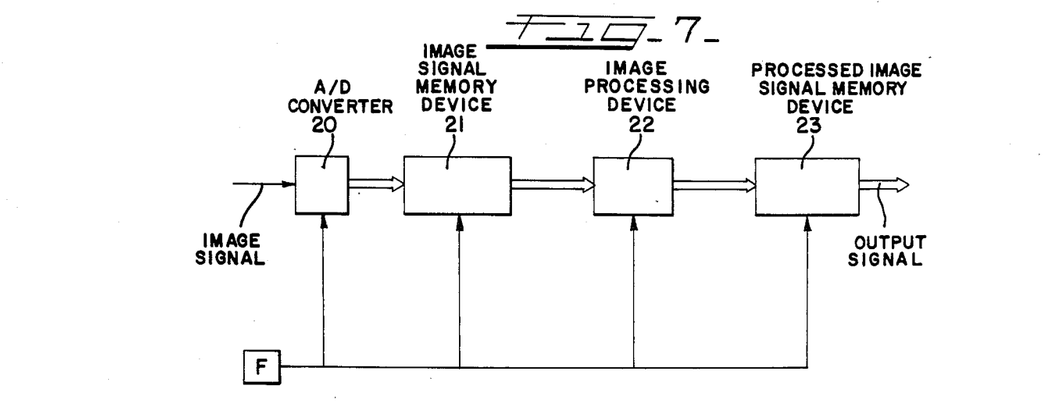
FIG. 7 is a simplified block diagram of an image reproduction circuit which uses previously existing technology.

This grid clock signal F, as shown in FIG. 7, is used in the following process: the image signal is read by the photoelectric transducer 12, undergoes A/D conversion in a converter 20, and is recorded into the image signal memory 21; the image signal is read out again, undergoes image processing in a component 22, and is recorded into the processed image signal memory 23; the resulting output signal is then read out and fed to the light modulator 14 FIG. 4.

Because this type of image reproduction apparatus is used in the fields of printing or plate-making and high-grade image reproduction or copying, the necessary image processor 22 includes tone correction, image enhancement, making halftones for making printing plates, enlarging, reducing, and so on. The multiplication ratio of the PLL frequency multiplier circuit which provides the grid clock signal F is determined by the frequency of the pulse signals S and the desired image resolution. For example, for a pitch of 100 μm for the light shield slits in the grid plate 18 and a resolution of 4 μm, the multiplication ratio should be 25. Of course, if it is possible to fabricate a grid plate 18 having the same light shield slit pitch as the needed resolution, the PLL frequency multiplier circuit becomes unnecessary, and the pulse signal S can simply be used as the grid clock signal F.

Although the performance of image reproduction apparatus using the technology described above has been improved somewhat by the means just described, the grid clock signal F which controls the various processing is obtained on the assumption that the operation of the galvano mirrors 6 and 6' is extremely stable. However, in actuality, the operation of these galvano mirrors is sometimes not stable, thus causing a loss of stability in the grid signal itself. This instability becomes more noticeable the higher the resolution required and the higher the magnification ratio of the grid clock signal.

In addition, if the grid clock signal is obtained by using the galvano mirrors, because only the outward swing, for example, of the mirrors is used, the time for the return swing is not used. Thus, for processing using this type of grid clock signal, there is a time with no signal corresponding to the return swing of the mirrors, which is approximately 40% of each cycle time. Because the various image processing must be performed in the remaining 60% of the cycle time, high-speed processing is necessary, and errors are more likely to occur when the various image processing is performed at high speed. As a result, an excessive amount of precision and features are required by the electrical circuits, thus increasing the complexity and cost of the circuits, and further increasing the possibility of errors.

In this way, with an image reproduction apparatus using conventional galvano mirrors, when laser scanning is used to generate the grid clock signal and perform the various image processing, because the grid clock signal itself lacks stability, the apparatus is insufficient for high-quality image reproduction, and the various problems discussed herein occur.

It is a general object of this invention to solve the above-described problems of the image reproduction apparatuses, which reproduce images by deflecting a laser beam through the use of galvano mirrors, and wherein various image processing is performed using a grid clock signal.

SUMMARY OF THE INVENTION

An image reproduction apparatus in accordance with this invention reproduces images through laser beam scanning using galvano mirrors. The apparatus includes a memory device which stores an image signal in an image signal memory in accordance with a grid clock signal; a reading/processing/writing device which reads the image signal from the image signal memory, performs image processing, and writes the processed image signal into a processed image signal memory in accordance with the clock signal from another clock generator; and a reading device which reads the processed image signal from the processed image signal memory in accordance with the grid clock signal.

In other words, in this invention, the image signal picked up through the scanning of laser beam deflected by the galvano mirrors is first amplified and processed as needed, and then it is converted to the digital signal by an A/D convertor, and the digital signal is stored in the image signal memory device in accordance with the grid clock signal. Next, in accordance with the clock signal from a different, more stable clock generator, such as a crystal oscillator, the image signal read from the image signal enhancement memory undergoes tone correction, image enhancement, making halftone, enlargement, reduction, or any other necessary image processing, and then the processed signal is stored in a processed image signal memory device. Next, the image reproduction device reads the processed image signal from the processed image signal memory and outputs it.

BRIEF DESCRIPTION OF THE DRAWINGS

The invention will be better understood from the following detailed description taken in conjunction with the accompanying figures of the drawings, wherein.

DETAILED DESCRIPTION

Figure 1:
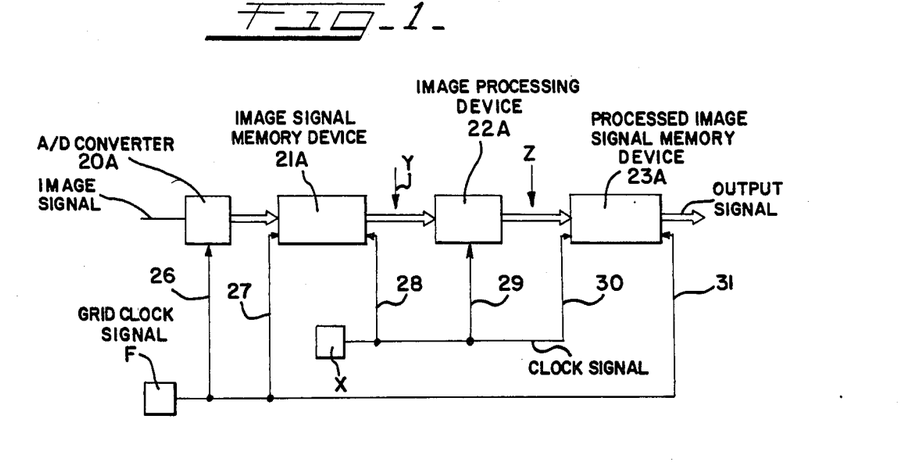
FIG. 1 is a simplified block diagram of an image reproduction apparatus in accordance with this invention.
Figure 2:
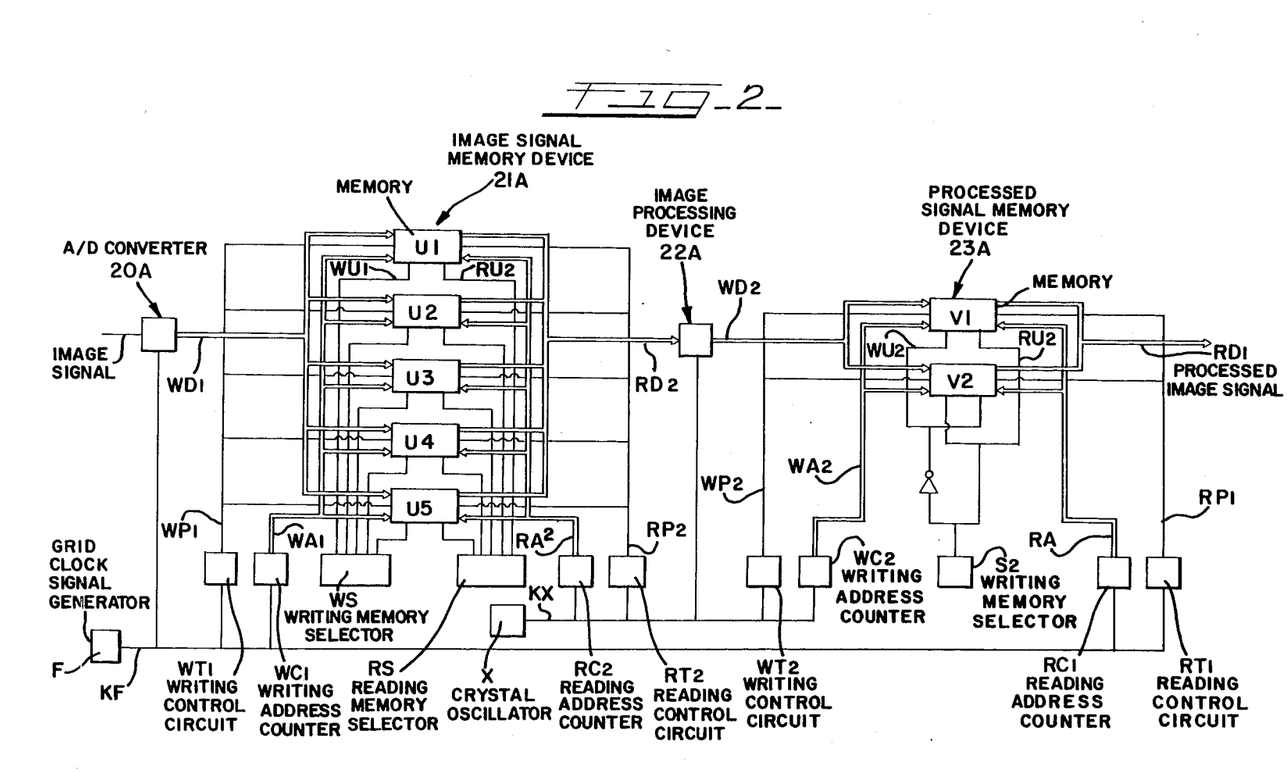
FIG. 2 is a schematic diagram showing the overall composition of an embodiment of an image reproduction apparatus in accordance with this invention.
Figure 3:
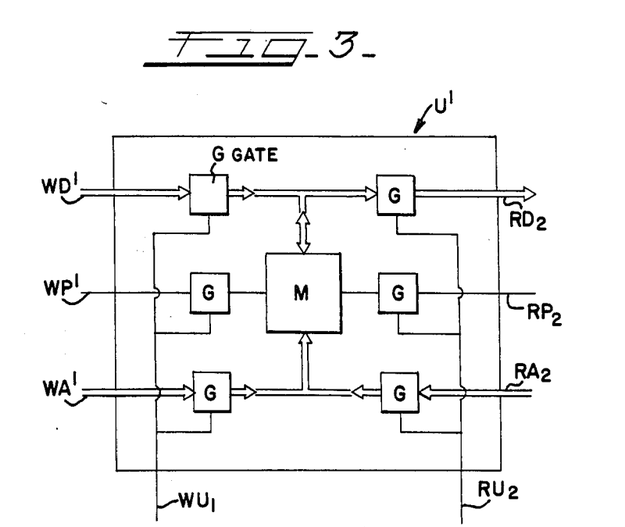
FIG. 3 is a detailed view of a part of the image signal memory of the apparatus.

A more detailed explanation of the image reproduction apparatus in accordance with this invention is now given with reference to FIGS. 1 through 3. In addition, concerning the optical, mechanical, and electrical composition of the apparatus the explanation refers to FIG. 4 and its appendant explanation as necessary; and concerning the generation of the grid clock signal F, the explanation refers to FIGS. 5 and 6 and the corresponding explanations. FIG. 1 is a simplified block diagram of the image reproduction apparatus according to this invention for comparison with the block diagram of the previously known technology shown in FIG. 7.

In a system in accordance with this invention, the image signal from a source such as the photoelectric transducer 12 is converted by A/D converter 20A and fed to an image signal memory 21A, and this is done in synchronization with the grid clock signal (F) which appears on lines 26 and 27. Image processing such as the reading of the image signal from the image signal memory 21A, the various necessary image processing components 22A, and the writing of the processed image signal into the processed image signal memory 23A are performed based on the clock signal from a separate, more stable clock generator x, such as a crystal oscillator. The clock signal x appears on the lines 28, 29 and 30 and is passed to the above components. Also, the other processig such as the reading of the processed image signal from the processed image signal memory 23A and the output of this signal is accomplished in synchronization with the grid clock signal F on the line 31.

Thus, although the reading of the original input, the image signal and the output for reproduction of the original are systematically performed using the grid clock signal F for accurate data on the position of the scaning laser beam, all of the image processing 22A, including the reading from the memory 21A and the writing into the memory 23A, is performed based on the accurate clock signal of the oscillation generator x, thus eliminating the possiblity of undesirable distortion, etc. Moreover, in this case, it is also possible to utilize the time of the return swing of the galvano mirrors, and processing can be performed at a relatively low speed. Therefore, operation errors can be prevented and the processed image signal can be systematically stored in the processed image signal memory 23A.

In FIG. 1, although the process from the reading of the image through the image processing and up to output of the processed image appears to be continuous in this block diagram, as indicated by the line Y and the line Z in the diagram, the image reading operation, the image processing operation, and the image output operation are each separate or independent, and in many cases signals are exchanged with other various image processing devices through non-continuous operation. In other words, in some cases, after only the reading function of one image reproduction device is used to read the image signal of an original and store it into the image signal memory, the image signal can be transferred to another image processing device, image processing can be performed by that image processing device, and the processed image signal can then be transferred back to the first image reproduction apparatus for output and image reproduction; and in other cases, an image or other data can be transmitted to the image reproduction apparatus from a completely different image or data processing system for various image processing or reproduction processing.

With the image reproduction apparatus using previously existing technology as shown in FIG. 7, if only one part of the functions of the image reproduction apparatus was to be used, or if an image signal was to be reproduced by transmitting among various devices, the lack of stability in the operation of the galvano mirrors would result in a considerable difference between the grid clock signal generated during the reading and the grid clock signal generated during subsequent image processing or output. This difference in the grid clock signals would make impossible accurate timing for the reading or writing functions into another memory device for the image signal or the processed image signal stored in the various memory devices. In addition, because the timing would also fail to match for the transmission of an image signal or other data between different devices, there would also be the problem of it not being possible to compose the image itself.

In comparison, with apparatus according to this invention, by performing the reading operation in accordance with the grid clock signal, performing the image processing between the image signal memory device and the processed image signal memory device in accordance with the separate, accurate clock signal of a clock generator such as a crystal oscillator, and performing the output operation in accordance with the aforementioned grid clock signal, completely error-free operation is possible even for the separate, independent operation such as that described above.

The following is a detailed explanation of a specific example of the image reproduction apparatus in accordance with this invention, shown in FIGS. 2 and 3. FIG. 2 shows the overall composition of the apparatus and FIG. 3 shows a detailed view of a part of the image signal memory device.

In FIG. 2, an A/D converter 20A, an image signal memory device 21A, an image processing memory device 22A, and a processed image signal memory device 23A, corresponding to the corresponding parts in FIG. 1, are shown. In FIG. 2, F indicates the grid clock signal generator, and X indicates another clock signal generator, preferably a crystal oscillator.

The image signal obtained by scanning the original, first undergoes amplification and other processing as needed, and then it is A/D converted in converter 20A in accordance with the grid clock signal KF from the grid clock signal generator F. The digitalized writing data WD1 from the converter 20A corresponding to the image signal is written into the image signal memory 21A based on the writing control signal WP1 generated by the writing control circuit WT1 in accordance with the grid clock signal KF and on the writing address WA1 provided by the writing address counter WC1 in accordance with the grid clock signal KF.

FIG. 2 shows five memories U1, U2, U3, U4 and U5 forming the image signal memory 21A. Thus one of the five memories U1 to U5 of the image signal memory device 21A is selected in accordance with the writing memory selector signal WU1 from the writing memory selector WS, and the writing data WD1 is written in that memory. For example, if one of the memories U1 to U5 is being used to read out data, the writing memory selector signal WU1 will be outputed by the writing memory selector WS in order to select a different memory.

In this way, the image signal is provided with an address and written into the image signal memory device 21A in accordance with the grid clock signal KF.

FIG. 3 is a detailed view of one of the memories U1 of the image signal memory device 21A, showing the conditions of the memory selector in accordance with the writing memory selector signal WU1. Each of the memories U1 to U5 is equipped with a gate G for each signal, and by means of the opening and closing of the gates G of each of the memories in accordance with the writing memory selector signal, the writing data WD1 is written in the appropriate memory.

Returning now to FIG. 2, the writing data which was written into the image signal memory device 21A is then read out from that memory device for the next image processing. The reading out of the writing data from the image signal memory device 21A is performed in accordance with a crystal clock signal KX from a crystal signal oscillator x, which is more stable than the grid clock signal generator F, and the reading data RD2 is then transmitted to the image processing device 22A. The reading out from the image signal memory device 21A is based on the reading control signal RP2 which is generated by the reading control circuit RT2 in accordance with the crystal clock signal KX and on the reading address RA2 provided by the reading address counter RC2 in accordance with the crystal clock signal KX. The selection of the appropriate memory U1 to U5 of the image signal memory device 21A is accomplished through the opening and closing of the gates G of each of the memories in accordance with the reading memory selector signal RU2 from the reading memory selector RS. The reading data RD2 corresponding to the various memory image signals is read out and sent to the next image processing device 22A. The various image processing performed by the image processing device 22A is also performed in accordance with the crystal clock signal KX.

After the necessary image processing has been performed, the processed image signal WD2 is written into the processed image signal memory device 23A based on the writing control signal WP2 generated by the writing control circuit WT2 in accordance with the crystal clock signal KX and on the writing address WA2 provided by the writing address counter WC2.

In the example shown in FIG. 2, two memories (V1 and V2) are shown for the processed image signal memory device. These two memories are provided in order to ensure efficient performance of the reading and writing, and it is possible to use even more memories. Thus, one of the two memories V1 and V2 of the processed image signal memory device 23A is selected in accordance with the writing memory selector signal WU2 output by the writing memory selector S2.

As described above, the reading data RD2 corresponding to the image signal read from the image signal memory device 21A in accordance with the crystal clock signal KX undergoes various image processing in the image processing device 22A in accordance with the crystal clock signal KX, and then, after processing, the processed image signal WD2 is systematically written into the processed image signal memory device 23A, again in accordance with the crystal clock signal KX.

Here, as mentioned earlier, the operation from the reading of the image signal memory device 21A to the writing into the processed image signal memory device 23A does not have to be performed by the same image processing device, but can be performed by a completely different image processing device.

Next, concerning the subsequent reproduction, i.e. output-operation, first the writing selector S2 functions and the appropriate memory V1 or V2 of the processed image signal memory device 23A is selected, and then the reading is performed based on the reading control signal RP1 which is generated by the reading control circuit RT1 in accordance with the grid clock signal KF and on the reading address RA1 provided by the reading address counter RC1.

In this way, in accordance with the processed image signal RD1 which is read out the laser beam B is controlled by the optical modulator 14 so that it scans on the recording material 15 and reproduces the image, etc.

The following is a description of a specific example of image processing. The example deals with the halftone processing and image enhancement used in the reproduction of printing plate originals.

In the halftone process, a signal corresponding to the density threshold value, for example according to the dither technique, is outputed from the threshold generator in accordance with the crystal clock signal, the image signal RD2 read from the image signal memory in accordance with the crystal clock signal and this threshold value signal are compared, and the halftone processed signal WD2 is stored in the processed image signal memory device 23A in accordance with the crystal clock signal. The halftone signal stored in the processed image signal memory device is read in accordance with the grid clock signal, and the halftone image is outputed onto, for example, photographic paper.

In addition, image enhancement is performed electronically by calculating between the average value of the image signal corresponding to the reading width (called a pixel) of the laser, for example, the image signal corresponding to a $5 \times 5$ pixel matrix, and the image signal being processed. For this kind of correction as well, the image signal is read from the image signal memory in accordance with the crystal clock signal from the crystal oscillator, the needed correction is performed, and the processed signal is then fed into the processed signal memory device in accordance with the crystal clock signal.

It will be apparent from the foregoing that, in accordance with this invention, while performing the writing of the image signal into the image signal memory device and the reading of the processed image signal from the processed image signal memory device in accordance with the grid signal allows each of the signals to be processed systematically in a configuration containing positional data, because reading from the image signal memory device, image processing, and writing into the processed image signal memory device are performed in accordance with a crystal clock signal under more accurate, wait-free conditions, image processing can be performed in a more stable and error-free configuration. As a result, the various processing circuits do not require any unnecessarily precision or complex hardware design, thus serving to prevent both cost escalation and operation errors. In addition, because this invention makes possible the partial use of the various functions of the image reproduction device and the exchange of signals with other models in accordance with a more stable clock signal, reliable processing free from operation errors is possible.

What is claimed is:

1. Image reproduction apparatus which reproduces images through laser beam scanning using scanning mirrors, comprising means for scanning an original and producing an image signal, first clock means for producing a first clock signal which includes a series of pulses at equal scanning pitches, memory means connected to receive said images signal and said first clocks signal and said image signal in an image signal memory in accordance with said first clock signal, second clock means for producing a second clock signal, processed image signal memory means, a reading and/or processing and/or writing device connected to receive said second clock signal and connected to said image signal memory and functions to read said image signal from said image signal memory, perform image processing, and write the processed image signal into said processed image signal memory means, and means connected to said first clock means and to said processed image signal memory means for reading and/or recording, and/or reproducing said processed image signal from said processed image signal memory means in accordance with said first clock signal.

2. Apparatus in claim 1, wherein said memory means, said reading and/or processing and/or writing device, and said reading means are each capable of performing their respective functions non-continuously.

* * * * *

UNITED STATES PATENT AND TRADEMARK OFFICE
CERTIFICATE OF CORRECTION

PATENT NO. : 4,769.717

DATED : September 6, 1988

INVENTOR(S) : Masashi Okamoto

It is certified that error appears in the above-identified patent and that said Letters Patent is hereby corrected as shown below:

In the listing of the Assignees on the first page,
Leo Giken Co., Ltd., Tokyo; Sakata Shokai, Ltd., Osaka, both of Japan should read Leo Giken Co., Ltd., Tokyo; Sakata Inkusu Kabushiki Kaisha, Osaka, Both of Japan Signed and Sealed this Thirty-first Day of January, 1989

Attest:

DONALD J. QUIGG

Attesting Officer

Commissioner of Patents and Trademarks